(12) United States Patent
Weber et al.

(10) Patent No.: US 9,725,185 B2
(45) Date of Patent: Aug. 8, 2017

(54) RAM AIR TURBINE OVERSPEED PROTECTION

(71) Applicant: Raytheon Company, Waltham, MA (US)

(72) Inventors: Richard M. Weber, Prosper, TX (US); Scott E. Johnson, Downey, CA (US)

(73) Assignee: Raytheon Company, Waltham, MA (US)

( * ) Notice: Subject to any disclaimer, the term of this patent is extended or adjusted under 35 U.S.C. 154(b) by 993 days.

(21) Appl. No.: 13/951,515

(22) Filed: Jul. 26, 2013

(65) Prior Publication Data

US 2014/0037423 A1 Feb. 6, 2014

Related U.S. Application Data

(60) Provisional application No. 61/678,314, filed on Aug. 1, 2012.

(51) Int. Cl.
*F02C 7/32* (2006.01)
*B64D 41/00* (2006.01)
*F01D 21/02* (2006.01)
*F03D 9/00* (2016.01)

(52) U.S. Cl.
CPC .......... *B64D 41/007* (2013.01); *F01D 21/02* (2013.01); *F02C 7/32* (2013.01); *F03D 9/00* (2013.01); *F05D 2220/34* (2013.01); *Y02E 10/72* (2013.01)

(58) Field of Classification Search
CPC ......... B64D 41/007; F01D 21/02; F02C 7/32; F03B 9/00; F05D 2220/34

USPC .......... 415/156, 182.1, 184, 185, 212.1, 220
See application file for complete search history.

(56) References Cited

U.S. PATENT DOCUMENTS

| 2,955,414 | A | * | 10/1960 | Hausmann | F02K 3/12 60/242 |
|---|---|---|---|---|---|
| 3,635,029 | A | * | 1/1972 | Menioux | F02K 3/075 60/224 |
| 3,834,161 | A | * | 9/1974 | Quigley, Jr. | F02C 7/32 60/244 |
| 5,503,188 | A | * | 4/1996 | Petrone | F16L 55/124 138/121 |
| 5,505,587 | A | * | 4/1996 | Ghetzler | B64D 41/007 415/144 |
| 6,270,309 | B1 | * | 8/2001 | Ghetzler | B64D 41/007 137/15.1 |

(Continued)

*Primary Examiner* — Ninh H Nguyen
*Assistant Examiner* — Aaron R Eastman
(74) *Attorney, Agent, or Firm* — Renner, Otto, Boisselle & Sklar, LLP

(57) ABSTRACT

A power generation system includes a ram air turbine that is connected to a generator. The power generation system may be located in a pod, for example a pod for mounting on an aircraft. The ram air turbine receives air that passes through an air path through the pod, going in through an air inlet, through the turbine to turn the turbine, and out through an air outlet. The system includes a deployable flow obstruction, such as one or more airbags, that are deployable to suddenly obstruct the flow through the air path. The obstruction may be used to cut off flow (or greatly reduce flow), when overspeed of the ram air turbine is detected. The obstruction deploys (for example, airbags deploy in an air inlet of the system) to prevent continuation of the overspeed operation of the turbine, which may damage parts of the system.

19 Claims, 5 Drawing Sheets

(56) References Cited

U.S. PATENT DOCUMENTS

| | | | | |
|---|---|---|---|---|
| 6,580,179 B2* | 6/2003 | Eccles | ............... | B64D 41/007 |
| | | | | 290/44 |
| 7,251,550 B2* | 7/2007 | Eschborn | ........... | G05B 23/0254 |
| | | | | 340/945 |
| 7,347,448 B2* | 3/2008 | Smith | ................ | B60R 21/26 |
| | | | | 280/736 |
| 7,466,532 B2* | 12/2008 | Nishimura | ............ | B60R 21/017 |
| | | | | 102/217 |
| 7,883,108 B2* | 2/2011 | Robinette | ............... | B60R 21/26 |
| | | | | 280/736 |
| 2011/0067393 A1* | 3/2011 | Chase | ................ | F16D 31/02 |
| | | | | 60/484 |
| 2011/0110776 A1* | 5/2011 | Gibson | ................ | F02C 7/04 |
| | | | | 415/220 |
| 2012/0171016 A1* | 7/2012 | Tersmette | ............. | B64D 39/00 |
| | | | | 415/121.3 |

* cited by examiner

RAM AIR TURBINE OVERSPEED PROTECTION

This application claims priority to U.S. Provisional Application 61/678,314, filed Aug. 1, 2013, which is incorporated by reference in its entirety.

FIELD OF THE INVENTION

The invention is in the field of power generation systems that include ram air turbines, and methods for controlling such systems.

DESCRIPTION OF THE RELATED ART

Ram air turbines and generators are sometimes used to generate power from an air flow.

SUMMARY OF THE INVENTION

If there is a hardware, software, or electrical failure with a ram air turbine generator (RATG) speed control system that includes aft articulating outlet doors, there can be an injurious overspeed condition that can damage the coolant pump, components in the cooling loop, and the generator, all driven by the ram air turbine (RAT). There is no known prior solution for internal RATs (inside a housing). External RATs (outside a housing) will free wheel the blade or feather the blade.

According to an aspect of the invention, upon detection of the onset of an overspeed condition, airbags or other deployable flow obstruct(s) will deploy in the RAT inlet ducts to shut down the flow of ram air.

According to an aspect of the invention, airbags are used in the ducting to shut down the flow of ram air quickly, such as in milliseconds, to starve a RAT that was about to go into an injurious overspeed condition.

According to other aspects of the invention, a ram air turbine (RAT) comprises: one or more airbags that are inflated for reducing air flow through the turbine when an overspeed condition is detected. The RAT may include one or more of the following features: inlet doors provide air inlet to the RAT; the airbags reduce flow through air inlet ducts defined by the inlet doors; the inlet doors also define heat exchanger inlet ducts; outlet doors provide controlled air outlet from the RAT; providing RATG speed control; the airbags reduce flow through air outlet ducts defined by the outlet doors; the outlet doors also define heat exchanger outlet ducts; one or more squib gas generators inflate the airbag(s); and/or the overspeed condition is detected using a tachometer.

According to another aspect of the invention, a method of operating a ram air turbine comprises inflating one or more airbags to quickly reduce air flow when an overspeed condition is detected.

According to yet another aspect of the invention, a power generation system includes: a ram air turbine; a turbine air inlet that provides air to the ram air turbine; a turbine air outlet that expels air that has passed through the ram air turbine, wherein the air inlet and the air outlet together define an air path that passes air through the ram air turbine; and a deployable flow obstruction that is deployable to suddenly block at least part of the air flow through the air path.

According to still another aspect of the invention, a method of controlling a ram air turbine includes the steps of: monitoring the ram air turbine for occurrence of an overspeed condition in the ram air turbine; and when an overspeed condition is detected, deploying a deployable flow obstruction in an air path that flows through the ram air turbine, to block at least some of the air flow through the air path.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A power generation system includes a ram air turbine that is connected to a generator. The power generation system may be located in a pod, for example a pod for mounting on an aircraft. The ram air turbine receives air that passes through an air path through the pod, going in through an air inlet, through the turbine to turn the turbine, and out through an air outlet. The system includes a deployable flow obstruction, such as one or more airbags, that are deployable to suddenly obstruct the flow through the air path. The obstruction may be used to cut off flow (or greatly reduce flow), when overspeed of the ram air turbine is detected. The obstruction deploys (for example, airbags deploy in an air inlet of the system) to prevent continuation of the overspeed operation of the turbine, which may damage parts of the system. A controller that controls deployment of the obstruction may receive input data from a tachometer that measures rotational speed of the turbine. The power generation system may also include a heat exchanger that is cooled by air passing through the pod. The flow of air to and from the heat exchanger may be substantially unobstructed by deployment of the flow obstruction.

Figure 1:
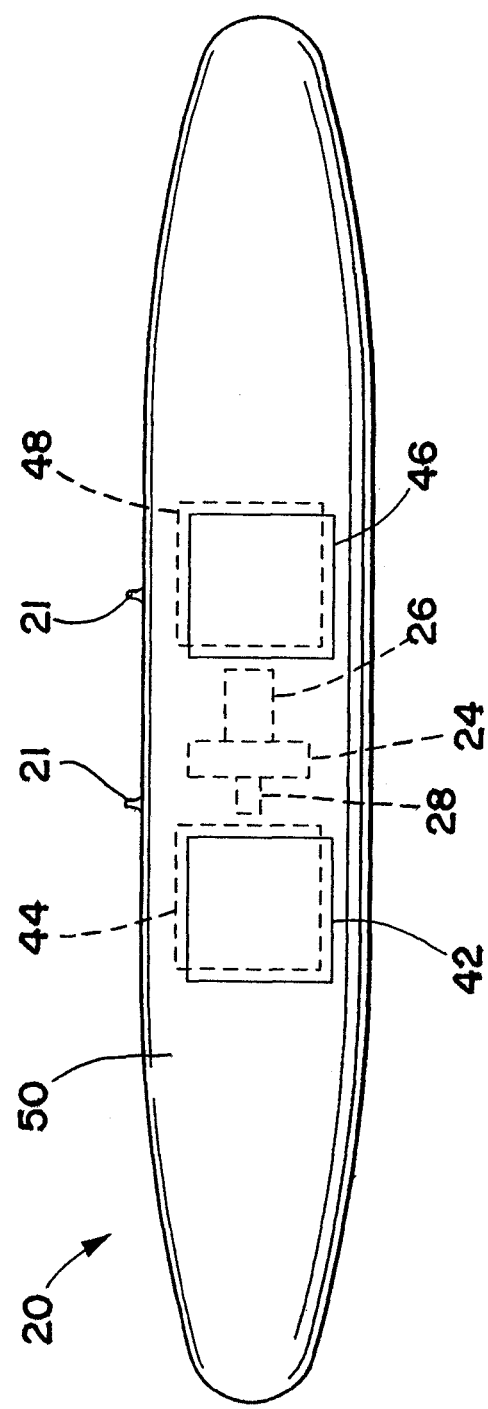
FIG. 1 is a side view of a pod that includes a power generation system in accordance with an embodiment of the present invention.
Figure 2:
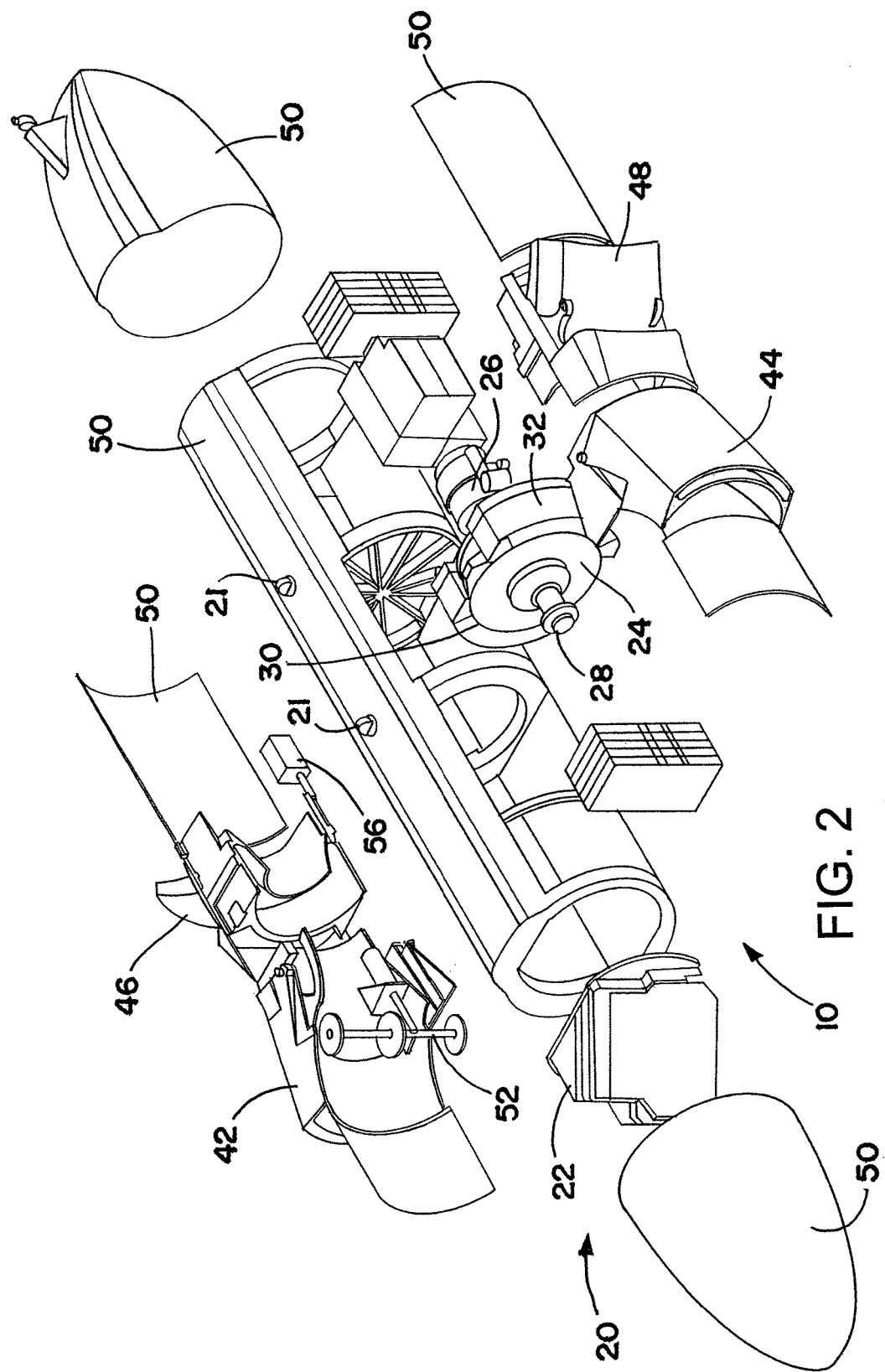
FIG. 2 is an exploded view of the pod.

FIGS. 1 and 2 show a power generation system 10 that is part of a pod 20 that may be mounted on an aircraft, for example at attachment points 21. The pod 20 in the illustrated embodiment is used for electronic jamming, with the power generation system 10 used to provide electric power for a jamming system 22. However, the power generation system 10 may be used to provide electric power for a large range of other purposes as well. The power generation system includes a ram air turbine 24, a generator 26, a cooling pump 28, and heat exchangers 30 and 32. During flight, ram air flows through the pod 20. The air turns the turbine 24 at high speed. The shaft of the turbine 24 is coupled to the generator, and the rotation of the turbine 24 allows the generator 26 to produce electrical power. The cooling pump 28 pumps a cooling fluid through the system 10 to cool the moving parts, and heat is dumped overboard (out of the pod 20) using the heat exchangers 30 and 32. The heat exchangers 30 and 32 may include plural plates or fins that allow air flow to pass through in an axial (longitudinal) direction. The pumped cooling fluid is in thermal communication with the heat exchangers 30 and 32.

The pod 20 includes a pair of forward doors 42 and 44, and a pair of aft doors 46 and 48. The doors 42-48 may open from a fuselage 50 of the pod 20. The forward doors 42 and 44 may be opened in flight by a forward door actuator 52. The aft doors 46 and 48 may be opened in flight by an aft door actuator 56. The actuators 52 and 56 may be any of a variety of actuators for converting power (such as electrical power, such as from a battery) to mechanical motion.

Figure 3:
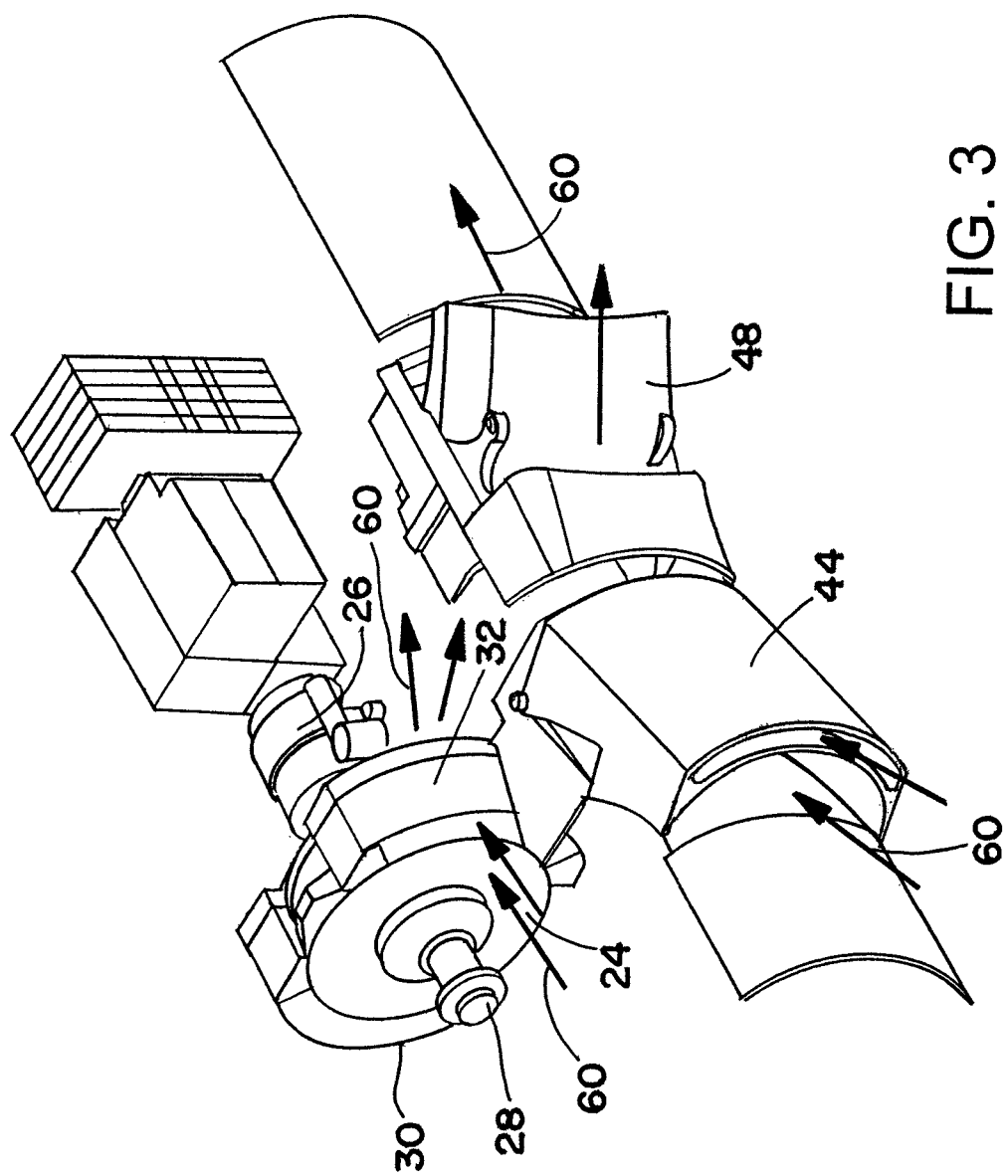
FIG. 3 is an oblique view of a portion of the power generation system.

Referring also to FIG. 3, the doors 42-48, and the ducts in them, together define a ram or tubine air path 60 that passes into the pod 20, through the turbine 24, and out of the pod 20. Air flow through the air path 60 enables the air turbine 24 to turn, in order to produce power. The air flow through the air path 60 may constitute substantially all of the air flow through the turbine 24.

Figure 4:
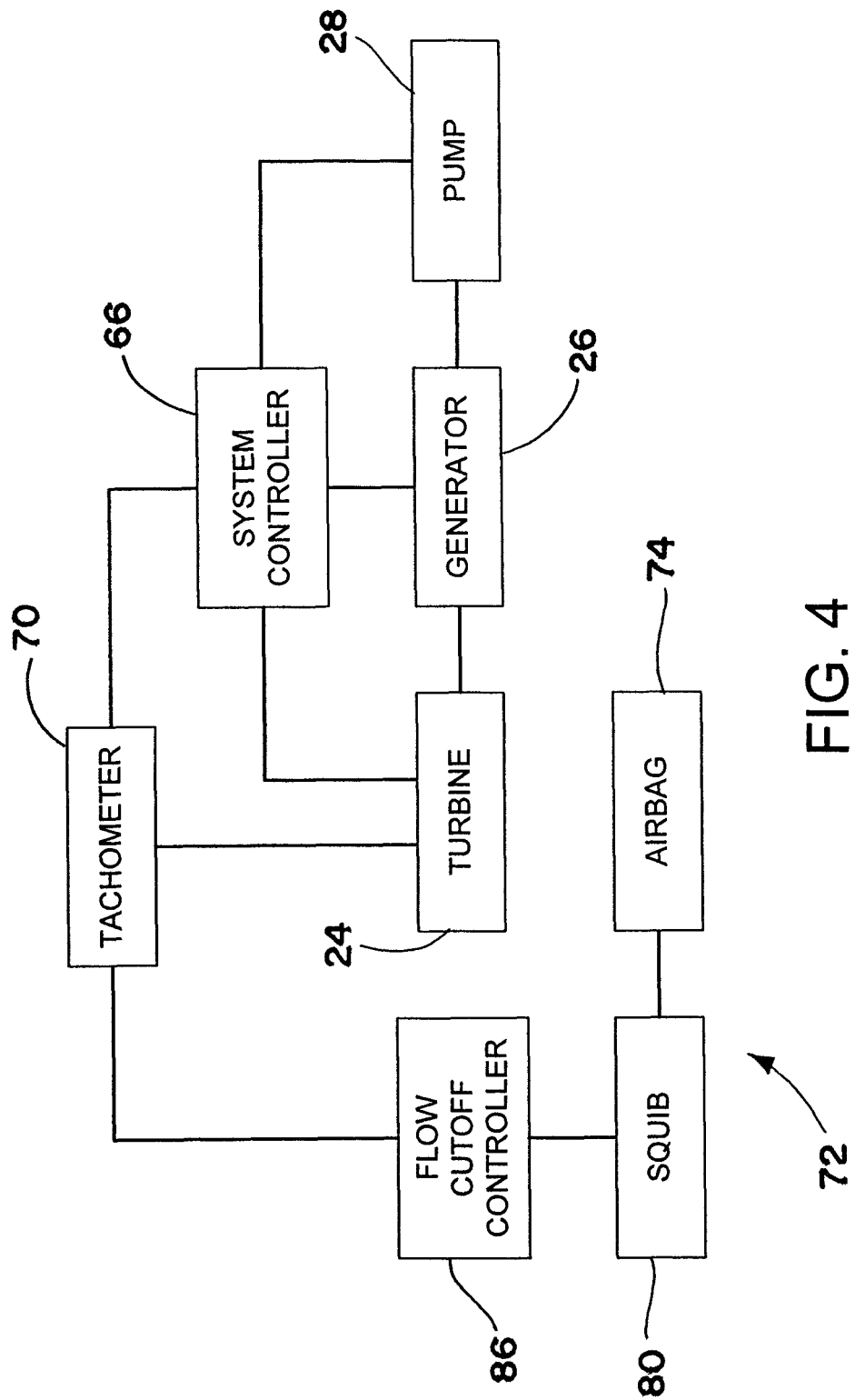
FIG. 4 is a block diagram of some elements of the power generation system.

With reference in addition to FIG. 4, the operation of the turbine 24 may be set by a system controller 66 that is operatively coupled to the turbine 24. The system controller 66 may also be coupled to other parts of the system 10, such as the generator 26, the cooling pump 28, and the actuators 52 and/or 56. The system controller 66 may be an integrated circuit or other type of circuit, any may receive input regarding the operation of the system 10, in order to effect control of the turbine 24 and perhaps other parts of the system 10. The system controller 66 may receive input from other parts of the system 10, for example from a tachometer 70 that measures the rotation rate of the shaft of the turbine 24.

The system controller 66 may be used to prevent the turbine 24 from overspeeding, from turning faster than it is intended to. The system controller 66 may control different parts of the system 10 to prevent overspeeding of the turbine 24, which might result in system failure and/or costly damage to parts of the system 10.

Figure 6:
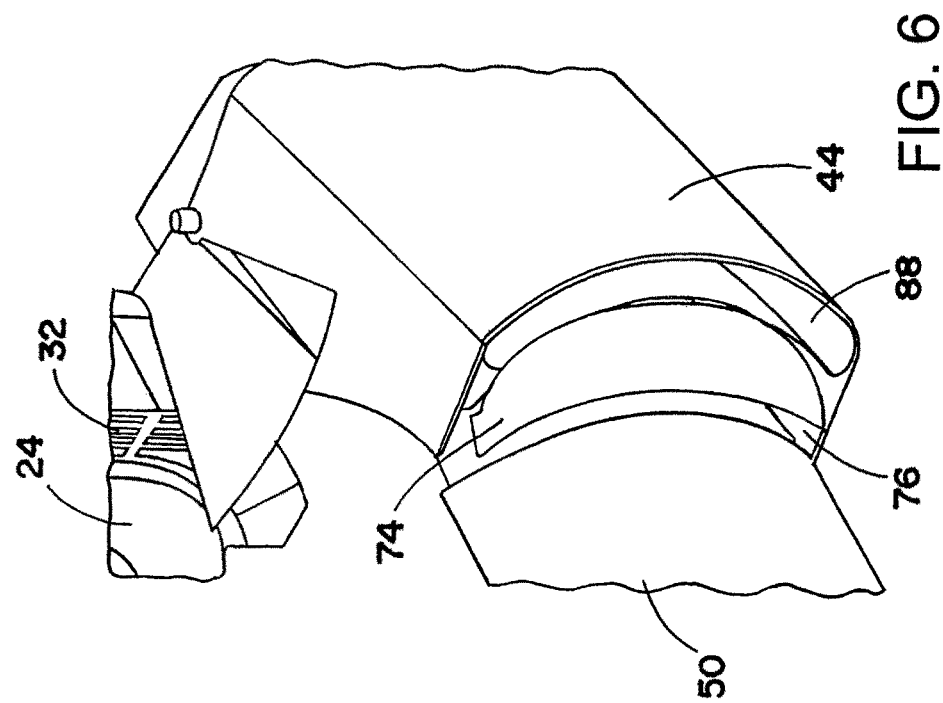
FIG. 6 is an oblique view of the part of the heat generation system, with the airbag deployed.
Figure 5:
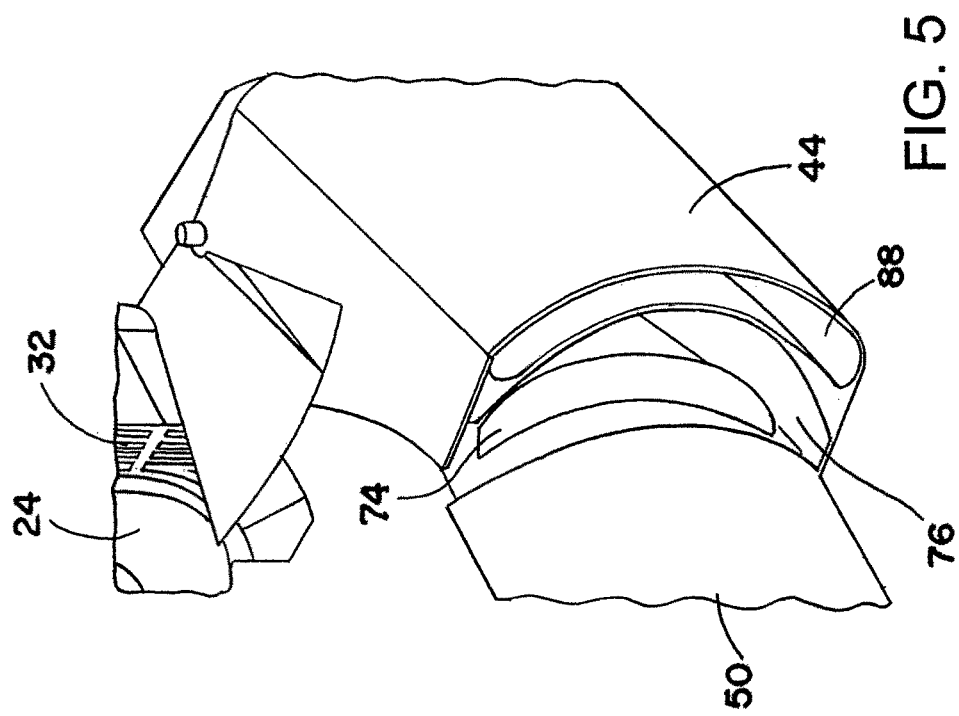
FIG. 5 is an oblique view of part of the heat generation system, with an airbag not yet deployed.

Referring now in addition to FIGS. 5 and 6, the system 10 may include a backup mechanism to prevent damage from overspeeding of the turbine 24. The system 10 includes a deployable flow obstruction 72 that may be deployed to suddenly reduce or cut off the flow through the air path 60 in milliseconds. In the illustrated embodiment the flow obstruction 72 includes an airbag 74 that may be deployed from its initial position, shown in FIG. 5, which allows flow through a turbine inlet duct 76, to a deployed position, shown in FIG. 6, which substantially fully blocks flow of air through the turbine inlet duct 76. The blockage may be of at least 95%, or at least 99% or more, of the flow that can pass through the inlet duct 76 when airbag 74 is in its initial (undeployed) position. The airbag 74 may be deployed by igniting a squib 80 that produces pressurized gasses to inflate the flexible fabric of the airbag 74. The squib 80 is controlled by a flow cutoff controller 86, an integrated circuit or processor device that fires the squib 80 when an overspeed condition in the turbine 24 is detected. The flow cutoff controller 86 may receive input from the tachometer 70 regarding the rotation speed of the turbine 24.

The condition for deploying the flow obstruction 72 may be a simple comparison as to whether the turbine rotation speed is greater than a predetermined overspeed threshold. In addition, acceleration of the turbine shaft may be taken into account in a decision regarding whether to deploy the flow obstruction 72.

For example, a turbine may be configured to operate at a maximum rotation rate of 11,250 revolutions per minute (rpm). If other controls on the turbine 24 fail (for example, due to an actuator mechanical failure, an actuator power failure, or a software failure), the turbine 24 may spin at a rate of up to 18,000 rpm, beyond its desired operating point. In such an overspeed condition the cooling pump 28 may cavitate and have its seals starved. Cooling system pressure may soar (increasing by 300%, for example), and any relief valves in the cooling system may be unable to accommodate such overpressure conditions. General failure may also result from the overspeed conditions. It would desirable to shut the system 10 down in such a way that restarting would be simple after the fault has been cleared.

The airbag 74 in the forward door 44 is one of a pair of airbags that constitute the flow obstruction 72. A similar airbag may be placed in the door 42 to stop flow through the turbine inlet duct of the door 42. The airbags may have separate squibs or other devices for generating pressurized gas, or alternatively may utilize the same squib.

Once the airbags 74 are deployed, it is intended that the system 10 remain shut down for the duration of flight. A ground crew may deflate the airbags 74, perhaps replacing them, and replace the squibs, to enable operation of the system 10 on future missions.

The doors 42-48 may also include ducts that provide an air path for cooling air to flow through the pod 10, to cool the heat exchangers 30 and 32. A separate heat exchanger duct, such as the heat exchanger duct 88, may be provided to separate the turbine air flow from the heat exchanger cooling air flow. The airbag 74 may block the turbine air flow while not interfering with the heat exchanger air flow. The use of separate ducts for the turbine air flow and the heat exchanger air flow may be limited to the inlet doors 42 and 44, or more broadly to whatever set of doors has the flow obstruction 72.

The airbag 74 has the benefit of fast action in blocking air flow, with the airbag 74 inflating in a time that is on the order of milliseconds. This allows rapid shutoff of flow when the turbine 24 exceeds the overspeed threshold, quickly preventing damage to the power generation system. Alternative ways of shutting off air flow, such as by using the actuators 52 and 56 to shut some or all of the doors 42-48, do not allow cessation of an overspeed condition with anything like the same speed.

The deployable flow obstruction 72 may alternatively be something other than the airbag 74 shown in the illustrated embodiment. For example, the deployable flow obstruction may alternatively be a rigid flow restriction plate that is actuated (positioned to obstruct flow) using a gas-fired piston.

The illustrated embodiment has the airbags, such as the airbag 74, located in the inlet doors 42 and 44. Alternatively the airbags or other deployable flow obstructions may be located elsewhere in the turbine air path 60, for example being located in the exit doors 46 and 48.

The power generation system 10 may be used in a variety of other devices in which fluid flow is used to generate electrical power. A high-speed windmill turbine is an example of another type of device. Also, ram air turbines can be located on a variety of aircraft, in any of a variety of locations.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A power generation system comprising:
a ram air turbine;
a turbine air inlet that provides air to the ram air turbine;
a turbine air outlet that expels air that has passed through the ram air turbine, wherein the air inlet and the air outlet together define an air path that passes air through the ram air turbine; and
a deployable flow obstruction that is deployable to block at least part of the air flow through the air path;
wherein the deployable flow obstruction includes one or more airbags that inflate to obstruct the air path; and
wherein the deployable flow obstruction fully deploys in no more than on the order of 1 millisecond.

2. The power generation system of claim 1, wherein the one or more airbags include at least one airbag that obstructs flow in the air inlet.

3. The power generation system of claim 1, wherein the one or more airbags include at least one airbag that obstructs flow in the air outlet.

4. The power generation system of claim 1, further comprising one or more squibs that can be fired to create pressurized gases to fill the one or more airbags.

5. The power generation system of claim 1, wherein the turbine air inlet is part of an inlet door that also includes a cooling air inlet that provides cooling air to a heat exchanger of the power generation system.

6. The power generation system of claim 5, wherein deployment of the deployable flow obstruction leaves unobstructed the flow of the cooling air to the heat exchanger.

7. The power generation system of claim 6, further comprising a cooling pump that is operatively coupled to the heat exchanger, and that is powered by the turbine.

8. The power generation system of claim 5, wherein the inlet door is openable in flight, to allow air to flow to the ram air turbine, with the one or more airbags that inflate to obstruct the air path.

9. The power generation system of claim 1, further comprising a controller operatively coupled to the deployable flow obstruction, to control deployment of the deployable flow obstruction.

10. The power generation system of claim 9, wherein the controller is also operatively coupled to the ram air turbine.

11. The power generation system of claim 10, wherein the controller receives data on the ram air turbine that is provided by a tachometer that measures rotation speed of the ram air turbine.

12. The power generation system of claim 10, wherein the controller deploys the deployable flow obstruction in response to an overspeed condition in the ram air turbine.

13. The power generation system of claim 1, wherein the power generation system is part of a pod that is couplable to an aircraft.

14. The power generation system of claim 1,
wherein the turbine air inlet includes multiple openable inlet doors;
wherein the turbine air outlet includes multiple openable outlet doors;
wherein opening the inlet doors and the outlet doors creates the air path;
wherein the one or more airbags include multiple airbags that are part of the inlet doors or the outlet doors.

15. The power generation system of claim 14, wherein the multiple airbags are parts of respective of the inlet doors.

16. The power generation system of claim 15, wherein the inlet doors each include a cooling air inlet that provides cooling air to a heat exchanger of the power generation system, with deployment of the airbags leaving open the cooling air inlets.

17. The power generation system of claim 1, wherein the deployable flow obstruction blocks at least 95% of air flow through the air path.

18. A method of controlling a ram air turbine, the method comprising:
monitoring the ram air turbine for occurrence of an overspeed condition in the ram air turbine; and
when an overspeed condition is detected, deploying a deployable flow obstruction in an air path that flows through the ram air turbine, to block at least some of the air flow through the air path;
wherein the deploying includes deploying one or more airbags as the deployable flow obstruction; and
wherein the deploying includes fully deploying the deployable flow obstruction in no more than on the order of 1 millisecond.

19. The method of claim 18, wherein the deploying includes deploying the deployable flow obstruction to block at least 95% of the air flow through the air path.

* * * * *